Figure 1:
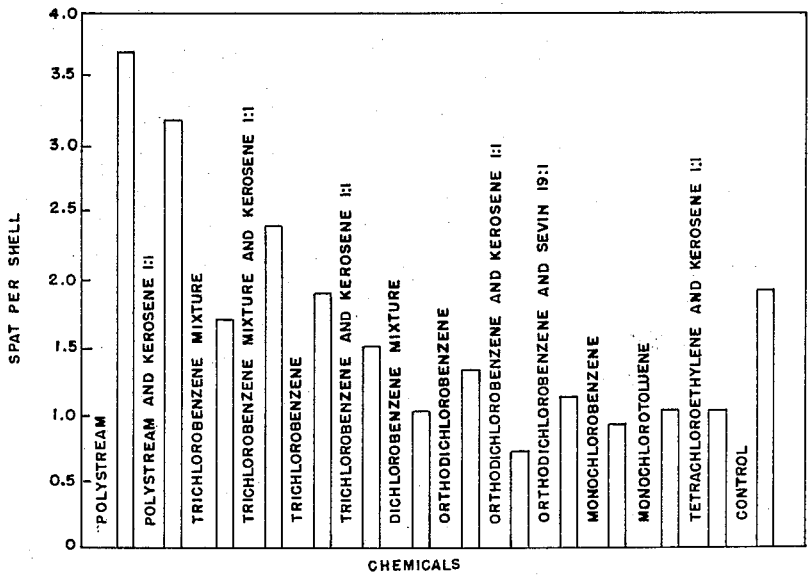

Sept. 10, 1963  V. L. LOOSANOFF ETAL  3,103,202
METHOD OF TREATING OYSTER SHELLS AND OTHER
COLLECTORS TO DIMINISH PREDATION
Filed May 31, 1962

INVENTORS
VICTOR L. LOOSANOFF
CLYDE L. MacKENZIE, JR.

BY

ATTORNEYS

3,103,202
METHOD OF TREATING OYSTER SHELLS AND OTHER COLLECTORS TO DIMINISH PREDATION
Victor L. Loosanoff, Milford, and Clyde L. MacKenzie, Jr., Stratford, Conn., assignors to the United States of America as represented by the Secretary of the Interior
Filed May 31, 1962, Ser. No. 199,201
8 Claims. (Cl. 119—4)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with a method for increasing production of shellfish, particularly oysters.

Oysters are the most important of the edible invertebrates and are currently gathered from oyster beds of the U.S. alone at an estimated rate of 26,000,000 bushels per year. Nevertheless, the production of oysters is seriously threatened by a number of natural enemies and an increased production is a basic need in most oyster growing areas of the world, particularly in Long Island Sound where the oyster population is now probably the smallest in the history of its oyster farming.

The oyster is very prolific and may produce as many as 100,000,000 eggs in a single season. The fertilized egg hatches to a larva which after about 48 hours is transformed to a free swimming bivalve animal. After about two weeks the animal settles to the bottom and must come to rest on a solid material to which it becomes firmly attached by means of a secretion produced by the mantle. The attachment of the animal is known as "set" and the young attached oysters are called "spat." In oyster farming, a variety of solid materials may be supplied on which the oyster may set. Such materials are known as "cultch" and usually consist of molluscan shells but may be gravel, treated wood, treated egg crates, roofing tiles covered by a thin layer of concrete or other synthetic material, such as plastics, tarred ropes, strings or chicken wire.

The relatively poor production of oysters in many areas is due to several causes, the most important of which are fouling of cultch and poor survival of set. Rapid fouling of cultch (collection of organisms other than oysters on the cultch) is particularly prevalent when the cultch is suspended in water. For example, in Milford Harbor, Connecticut, oyster shells or artificial cultch will be converted into balls composed of numerous fouling organisms within two or three weeks after planting. Fouling organisms include barnacles, tunicates, worms, hydroids and the protozoan, Folliculina. Poor survival is due primarily to attacks by predators, chiefly starfish and oyster drills, the latter a marine snail which settles on the young oyster, bores a hole in the shell with its rasping tongue and sucks out the soft parts of the oyster.

Previous methods of controlling shellfish have been of three types, namely, biological, mechanical and chemical. Biological methods have thus far not been found practical since they are difficult to develop and execute. Mechanical methods have been used extensively but are expensive and usually only partially effective, although a recently developed method of burying drills and starfish under a thin layer of bottom material appears to show promise. Probably the greatest progress in recent methods of controlling shellfish enemies has been made in the use of chemicals which may be used in several ways as: (1) dissolved in water; (2) spread over large areas of the bottom as a thin layer to repel enemies or kill them on contact; (3) in the form of barriers or belts made of chemicals mixed with materials of an inert nature such as sand which surround the oyster bed; (4) incorporated as poisons in foods that will be eaten by shellfish predators; (5) combined with shells or other spat collectors to make them either unsuitable for the existence of such forms as sponges, worms and other shell dwelling organisms or to prevent fouling by tunicates, hydroids, barnacles, Crepidula, worms, algae, etc.; (6) combined with cultch to repel or kill drills or starfish or larvae of other undesirable forms such as flatworms which may set on the cultch and attack the oyster set.

Attempts have been made to increase oyster production by treatment of cultch with insecticides such as DDT and Lindane. However, such methods require careful adjustment of the amount of insecticide to avoid inhibiting setting of oysters as well as fouling organisms. Furthermore, in the case of DDT, time of planting is important since the effect of the DDT wears off if the chemically-treated collectors are planted prior to oyster setting time.

It is accordingly an object of the present invention to provide a chemical treatment of oyster cultch which will be effective in preventing fouling of the cultch with organisms other than oysters.

It is a further object of the invention to provide a chemical treatment of cultch which will increase the set of oysters on the cultch.

It is a further object of the invention to provide a chemical treatment of cultch which will serve to protect the set oysters from predators.

Other objects and advantages will be apparent from the remainder of the disclosure.

It has now been found that these objectives may be accomplished by treatment of the cultch with a chlorinated benzene, particularly the more highly chlorinated benzenes such as tri- and tetrachlorobenzene. Such treatment has been found to result in a large increase in the number of live oysters on the cultch while greatly reducing fouling. Furthemore, the growth of set on treated cultch has been found to be substantially greater than on untreated cultch. In addition, the number of drilled oysters (those attacked by the oyster drill) was much lower on the treated cultch.

The following examples will serve to more particularly describe the invention and illustrate the advantageous results achieved therewith. In each case, oyster shells were employed as cultch.

EXAMPLE 1

Figure 2:
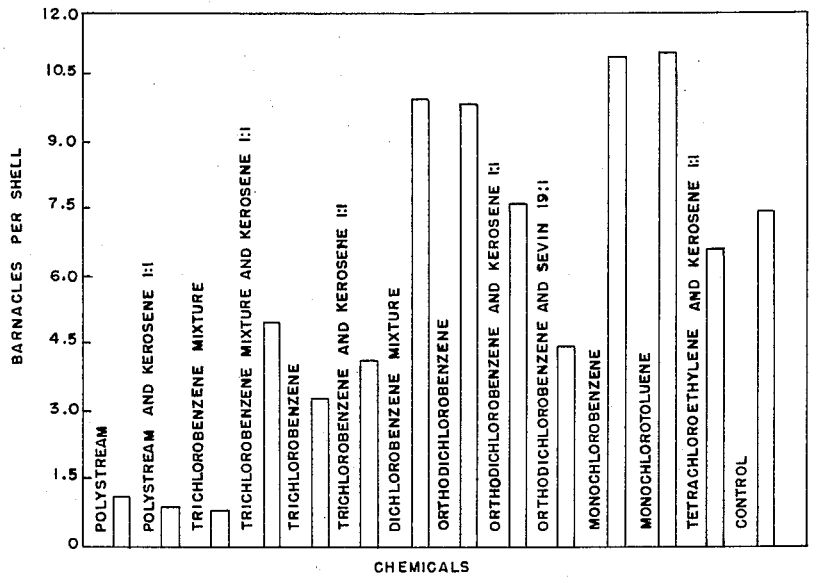

In this example the shells were treated with a variety of compounds and mixtures, the results of which are shown in FIGS. 1 and 2. Dried shells were soaked in the test chemical for 18 hours and then placed in individually numbered bags made of chicken wire, 40 shells to a bag. Bags containing shells treated with the same chemical were then wired together in groups of four, the individual bags in the groups having been dried following impregnation for different periods of time, namely fifteen minutes, one, four and six hours. Thirty-two such quartets were then planted in Milford Harbor, Milford, Connecticut, parallel to the shore, about six feet apart and about two feet below the low watermark. Each quartet was laid on a plastic sheet since the bottom was soft mud. After a period of about 100 days, the shells were examined for the presence of oysters and fouling organisms, a dissecting microscope being used, when needed, in examination and counting. Heavily silted shells were discarded as this condition, obviously, would have prevented normal setting and only those quartets in which at least 100 shells remained unsilted were examined. Since the intensity of setting of oysters was not significantly different on shells dried for different periods, the data obtained from examination of all bags of each quartet were combined. Of the original 32 quartets, however, only 16 were examined, the remainder being too heavily silted.

The Polystream employed in the example, furnished by the Hooker Chemical Corporation of Niagara Falls, N.Y., was a mixture of chlorinated benzenes having the following composition:

| | Percent |
|---|---|
| 1,2,4,5-tetrachlorobenzene | 4.3 |
| 1,2,3,4-tetrachlorobenzene | 44.6 |
| 1,2,4-trichlorobenzene | 32.9 |
| 1,2,3-trichlorobenzene | 3.1 |
| Pentachlorobenzene | 9.1 |
| Monochlorobenzene | 1.3 |
| Orthodichlorobenzene | 0.7 |
| Paradichlorobenzene | 2.1 |
| Others | 1.9 |

The trichlorobenzene of the example was a mixture of various isomers with the 1,2,4-trichloro- and 1,2,3-trichloro-compounds being predominant.

As may be seen from FIG. 1, the number of spat was greatest on the highest chlorinated benzenes, the Polystream-treated shells showing the best results with an average of 3.7 spat per shell as compared to 1.9 per shell in the case of the untreated control. In most instances kerosene, commonly used as a vehicle for chemical treatment of cultch, appeared to inhibit setting, and perhaps survival of set.

As shown in FIG. 2, shells treated with Polystream, a mixture of Polystream and kerosene and the trichlorobenzene mixture had collected only about one-seventh as many barnacles as untreated controls. Trichlorobenzene and the orthodichlorobenzene-Sevin (1-naphthyl-N-methylcarbamate) mixture are also seen to have substantial effect in inhibiting fouling by barnacles. Polystream and Polystream mixed with either kerosene or orthodichlorobenzene were also found to be very effective in prevention of fouling by Folliculina (a protozoan) and brown algae. Polystream also prevented, to a large degree fouling with tube-building worms, Polydora, single and colonial tunicates and mussels. The compounds, however, did not appear effective against bryozoa.

EXAMPLE 2

This example describes the results of further large scale experiments with Polystream in which two groups of shells, each composed of 2,500 bushels, were employed. The shells of one of the groups was sprayed with Polystream so that their entire surface was covered with the compound, the other group serving as the control. The shells were planted in New Haven Harbor at a depth of from about 10 to 15 ft. for a period of 46 days. They were then collected and examined, the collection being made by divers, making an average of five dives per bushel of shells. Therefore, each bushel contained small samples from many areas and, consequently, the final count was based on random samples from almost the entire treated area, thus offering a reliable picture. The results are shown in the following table.

| Numbers or Percentages per Bushel | Polystream-treated | Control (untreated) |
|---|---|---|
| Live oysters | 2,316 | 837 |
| Drilled oysters | 9 | 38 |
| Oyster scars | 241 | 258 |
| Total oysters | 2,566 | 1,133 |
| Percent total drilled | 0.4 | 3.4 |
| Percent scars | 9.4 | 22.8 |
| Average size, mm | 8.5 | 6.2 |
| Maximum size, mm | 25.0 | 20.0 |
| Crepidula | 490 | 4,266 |

It will be seen that the number of live oysters on the Polystream-treated shells was almost three times as great as on the untreated ones. The percentage of drilled oysters was approximately 8½ times lower on treated than on untreated shells. Examination further showed that the chemically-treated shells were much cleaner than the untreated ones with a particularly striking difference in the case of Crepidula, a slipper-shell limpet or quarter-decker which competes with oysters for space and food, there being approximately nine times as many of these on the non-treated as on the treated shells.

Also, as indicated in the table, the average size of spat on the treated shells was 8.5 mm. as compared to 6.2 mm. on untreated shells. This increased growth is also reflected in the maximum size of spat which was 25 mm. on treated and 20 mm. on untreated shells. It will also be noted that the number of drilled oysters on untreated shells was about 8½ times that on treated shells.

The highly beneficial effect on the treatment of cultch with chlorinated benzenes is believed apparent from the data on the above examples. The exact explanation of the beneficial effect of these chemicals is not known but they appear to act as a contact poison to fouling organisms and predators while being substantially harmless or even beneficial to oysters. To test this possibility two experiments were conducted, one under laboratory conditions and the other in the field.

EXAMPLE 3

In the first experiment, shells which had been previously treated with Polystream and placed in Long Island Sound to collect set were brought into the laboratory and placed in a trough of running water. These shells had 44 young oysters measuring 2 to 5 mm. in length. In a similar trough were placed untreated oyster shells with 33 spat of the same size as above and from the same area. Finally 15 drills were placed in each trough. After seven days no spat on the Polystream-treated shells were killed while several on untreated shells were drilled. It was also found during this experiment that if drills were placed directly on chemically-treated shells they could not move and soon became swollen while on the untreated shells the drills were uneffected.

EXAMPLE 4

A further experiment was performed by suspending treated and untreated shells in Milford Harbor during the setting of the flatworm, Stylochus. When these shells were examined later, not a single living Stylochus was found on 50 chemically-treated shells, while 26 living young worms were counted on only eight control shells. The treatment thus appears to provide good protection against attack by flatworms.

Although the chlorinated benzenes alone are usually sufficient to repel or significantly diminish the setting and growth of fouling organisms and promote setting of oysters, it may be possible in some instances to increase efficiency by addition of other compounds to the chlorinated benzenes, the latter being good solvents for many compounds. Compounds which may be added and which have been found effective against certain types of competitors and predators are shown below, grouped under the organisms against which they are effective.

*Competitors*

CREPIDULA SP.

2-nitro isobutyl octanate
Bis(2-nitro isobutoxy)methane
2-nitro-1-phenyl-1-propane
Bis(2-ammoisobutoxy)methane
1,3-diamino neopentane

TUNICATES

Malachite Green oxalate
2-chloro-1-nitropropane
2-nitro-1-phenyl-1-propane
Bis(2-nitro isobutoxy)methane
$N^1$-dihydroabietyl-2-methyl-1,2-propane diamine

POLYCHAETE WORMS 2-chloro-1-nitropropane
2,4,6-triiodophenol
p-(2,4-dinitroanilino)phenol
Bulan crystalline (1,1 bis(p-chlorophenyl-2-nitro butane))
4-nitrobenzeneazoresorcinol

MUSSELS

Victoria Blue
Blue LBI
Onyx emulsifier
4-nitrobenzeneazoresorcinol
$N^1$-dihydroabietyl-2-methyl-1,2-propane diamine

SPONGES 3,4-dichlorobenzyl chloride
5-amino-5-ethyl-2-methyl-2-(2 - carboethoxyethyl) - 1,3-dioxane
Tris(octanooxymethyl)dimethyl aminomethane
2,6-diaminopyridine

Predators

DRILLS

Sevin (1-naphthyl-N-methyl-carbamate)
Dimethallyl sulfide
Phenyl allyl sulfide
2,3-dibromo-1,4-dichlorobutane
3,4-dichlorobenzyl chloride
Tetraethyl pyrophosphate

STARFISH 2-nitro-2-ethyl-1,3-propane diol dipropionate
5-amino-2,5-diethyl-2-methyl-1,3-dioxane
Roccal (a 50% concentrate of alkyl dimethylbenzyl ammonium chlorides)
2-chloro-1 nitro propane
$N^1,N^1$-dibutyl-2-methyl-1,2-propane The chlorinated benzene compounds may be applied to the cultch in any convenient manner. When large quantities of shells are to be treated, as in Example 3 above, the operation is mechanized and utilizes a conveyor for transporting the shells from a shell bed to a special spraying unit comprising a drum containing the chemical which is pressure-released by means of several jets. Another conveyor then serves to load the shells on a boat for planting on selected oyster beds.

The amount of chemical employed is not critical and will depend on a variety of factors such as the depth of the bed, temperature, water currents, types of competitors or predators, amount of silt, etc. Ordinarily, an amount which ensures that the surface of the shell or other cultch is well covered is sufficient.

Though the above examples employ shells as cultch, the invention is not limited to such shells but may be employed with any of a wide variety of cultch as disclosed above.

What is claimed is:

1. In the cultivation of shellfish, the method comprising treating cultch with a composition comprising a polychlorinated benzene from the group consisting of trichlorobenzene and tetrachlorobenzene to prevent fouling, promote setting and prevent predation.

2. The method of claim 1 in which the chlorinated benzene composition comprises a mixture of trichlorobenzenes.

3. The method of claim 1 in which the chlorinated benzene composition comprises tetrachlorobenzenes.

4. The method of claim 1 in which the cultch are oyster shells.

5. The method of claim 4 in which the chlorinated benzene composition comprises a mixture of trichlorobenzenes.

6. The method of claim 4 in which the chlorinated benzene composition comprises tetrachlorobenzenes.

7. The method of claim 1 in which the polychlorinated benzene composition comprises a mixture of trichlorobenzene, tetrachlorobenzene and pentachlorobenzene.

8. The method of claim 4 wherein the polychlorinated benzene composition comprises a mixture of trichlorobenzene, tetrachlorobenzene and pentachlorobenzene.

References Cited in the file of this patent

UNITED STATES PATENTS

| | | |
|---|---|---|
| 2,627,488 | Zakheim | Feb. 3, 1953 |
| 2,714,572 | Hansen | Aug. 2, 1955 |
| 2,853,049 | Glancy | Sept. 23, 1958 |
| 2,922,393 | Munz | Jan. 26, 1960 |